March 14, 1961 C. D. EMMONS 2,975,119
VERTICAL ROD DRIVE MECHANISM
Filed Dec. 5, 1958
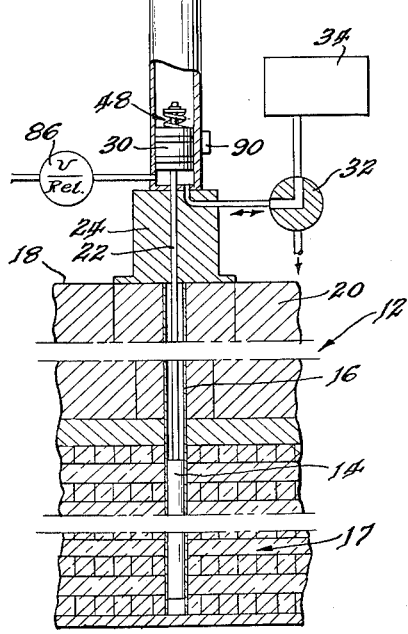
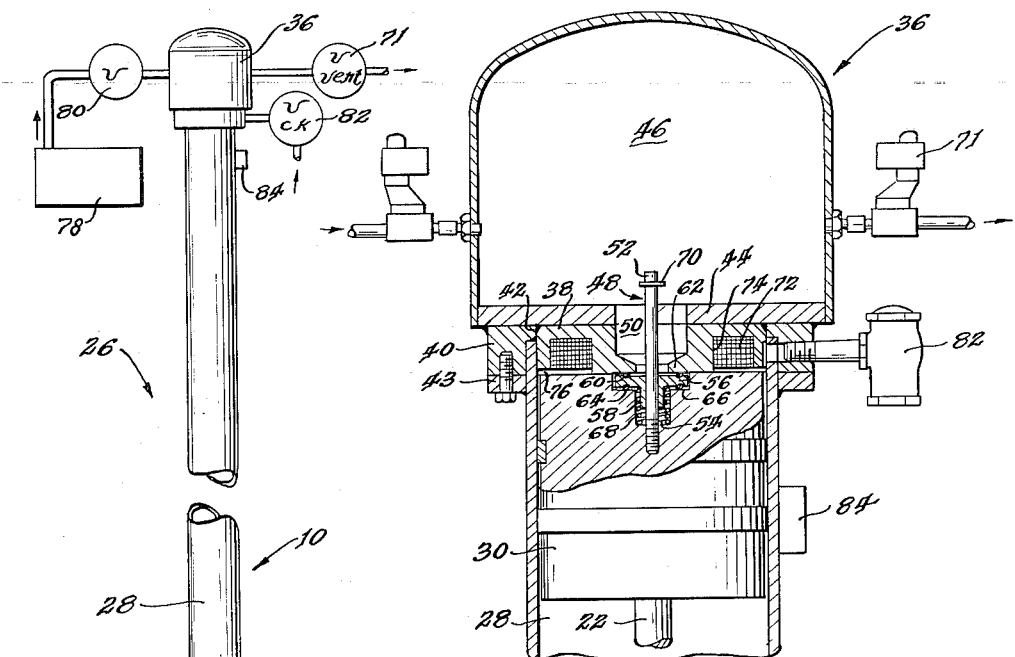
INVENTOR.
Clarence D. Emmons
BY
Roland O. Anderson
Attorney

United States Patent Office 2,975,119
Patented Mar. 14, 1961

2,975,119

VERTICAL ROD DRIVE MECHANISM

Clarence D. Emmons, Richland, Wash., assignor to the United States of America as represented by the United States Atomic Energy Commission Filed Dec. 5, 1958, Ser. No. 778,549

6 Claims. (Cl. 204—193.2)

This invention relates to drive mechanisms for translating rods, and more particularly to fast acting drive mechanisms for driving vertically disposed rods such as may be used for safety elements in nuclear reactors of the type disclosed in Patent No. 2,708,656, inventors Enrico Fermi and Leo Szilard, filed December 19, 1944.

Safety elements are used with nuclear reactors to immediately shut down or "scram" the nuclear reaction when an operating condition is sensed to be beyond the predetermined conditions of safe operation. In thermal nuclear reactors "scram" shutdown is accomplished by inserting neutron absorbing materials generally in the form of rods into the reactor core. A safety system for suitable operation must be capable of shutting down the reactor fast enough to prevent reactor damage by the condition that initiated the "scram." In most cases this means the rod must operate within a fraction of a second. It has been found that a safety rod to attain 95% of its effective nuclear control needs to travel approximately 80% of the depth of the reactor core. In small reactors the gravitational force operating on vertically disposed safety rods is sufficient to insert the rod within the required time to shut down the reaction. However, in larger reactors the travel distance is too great for the gravitational force to insert the safety rod in the required time. It is therefore an object of this invention to provide a drive mechanism for a vertically disposed rod which is operable to translate the rod at a velocity sufficient for its intended use.

To meet the maximum safety requirements for the operation of nuclear reactors it is required that the safety rod driving mechanism be fail-safe. That is, the rods should be caused to enter the reactor upon any malfunctioning of the safety rod drive mechanism. It is thus another object if this invention to provide a fail-safe drive mechanism for a vertically translatable rod.

Nuclear reactors have been known to shut themselves down in response to scram signals which were either inadvertent or transient. It is therefore important that the safety rods be capable of quick withdrawal from the reactor so that it may be re-started before the xenon building is large enough to prevent a subsequent startup. It is therefore another object of this invention to provide a drive mechanism for a vertically translatable rod which may quickly recover the rod from its initial vertical translation.

Other objects and advantages of this invention will become self-evident upon a further reading of this specification especially when read in view of the accompanying drawings in which:

Fig. 1 is an elevation view partly in section of the drive mechanism for a vertically disposed safety rod mounted on top of a nuclear reactor;

Fig. 2 is a section view of the upper end of the drive mechanism shown in Fig. 1.

The objects and advantages of this invention are best practiced in an apparatus for operating a vertically translatable rod comprising a piston attached to the upper end of the rod and a cylinder in which the piston and rod move. The upper end of the cylinder is provided with an electromagnet with an aperture therethrough adapted to receive valve means at the upper end of the piston. The valve means are adapted to close the aperture in the magnet as the piston approaches the magnet so that gas is trapped in the upper end of the cylinder between the electromagnet and the piston to serve as a cushion when the rod is being translated upwardly. An accumulator tank and air supply communicates with the upper end of the cylinder through the magnet aperture to provide the necessary downward thrust. Air supply means are also provided at the lower end of the cylinder for translating the rod upwardly. Cushioning means are also provided at the lower end of the cylinder for preventing damage in the downward translation of the rod respectively.

Reference is made to Fig. 1 wherein is shown a safety rod system 10 in conjunction with the graphite block moderated nuclear reactor 12. A safety rod 14 containing a high absorption cross section for thermal neutrons is vertically translatable within a tube 16 extending vertically through the active portion 17 of the reactor to the upper surface 18 of the concrete reactor top shield 20. The safety rod 14 has an extension 22 which reaches through the top shield 20 of the reactor 12 and a mounting block 24 resting on the top shield 20 to a safety rod drive mechanism 26.

The drive mechanism 26 comprises an air cylinder 28 in which a piston 30 connected to upper end of the safety rod extension 22 is translatable. In Fig. 1 the safety system is shown with the safety rod 14 fully inserted in the active portion 17 to shut down the nuclear reaction. The piston 30 at the upper end of the safety rod extension 22 is thus in its lowermost position within the cylinder 28.

Prior to initiation of a nuclear reaction in the reactor 12 the safety rod 14 may be extracted from the reactor by means of air pressure supplied to the bottom of the cylinder 28 through a solenoid operated 3-way valve 32 connecting the cylinder 28 to a pressurized air source 34. The pressurized air at the bottom of the cylinder 28 will act upon the piston 30 and move it upwardly to withdraw the safety rod 14 from the reactor active portion 17.

The upper end of the cylinder 28 terminates in an assembly 36 comprising an annular magnet core 38 and an annular fitting 40. They are welded together at 42 and bolted to a flange 43 adjacent the top of the cylinder as shown in Fig. 2. The magnet core 38 and fitting 40 are welded to an annular plate 44 which forms the bottom of an accumulator tank 46 the purpose of which will be hereinafter described.

The aperture 50 serves to provide communication between the upper end of the cylinder 28 and the accumulator tank 46. The upper end of the piston 30 is provided with a valve assembly 48 for controlling the communication therebetween. The valve means is axially aligned with aperture 50 formed by the annular shaped magnet 38 and plate 44 and comprises a rod 52 threaded into the bottom of a recess 54 in the top of the piston 30. A disk 56 slidably engages the rod 52 and has a hub 58 to maintain the disk 56 perpendicular to the axis of the rod 52. An O-ring seal 60 is provided on the upper surface of the disk 56 and engages an annular lip 62 projecting inwardly from the annular magnet core 38. Another O-ring seal 64 is provided on the under surface of the disk 56 and engages a shoulder 66 in the recess 54. A helical spring 68 surrounds the rod 52 engaging the disk 56 around the hub 58 and is adapted to constrain the disk 56 against a retaining head 70 when the upper end of the rod 52 is not within the aperture 50. It will be noted that when the upper end of the rod 52 is within the aperture 50 in the upper end assembly 36 the disk 56 is constrained against the lip 62 therein and the interior of the cylinder 28 is sealed off from the interior of the accumulator tank 46. Thus as the piston 30 approaches the upper end of the cylinder 28 in its upward movement air is trapped in the space between the piston and the upper end of the cylinder which serves as a cushion to prevent damage to the piston. A solenoid operated normally closed vent valve 71 is provided on the accumulator tank 46. This valve is opend when the rod is being raised to prevent an excessive pressure build-up in the accumulator before the valve means seals the aperture 50.

The safety rod 14 is held in its uppermost position out of the reactor 12 by magnetic means comprising the magnet core 38 and an annular coil 72 disposed within the annular recess 74 in the magnet core 38. When an electric current is flowing through the coil 72 a magnetic flux is established which attracts the piston 30, which is fabricated of magnetizable material, holding it against the magnet core 38. An air gap 76 is provided around the outer edge of the magnet 38 so that the magnet will not hold the piston due to residual magnetism when the coil is de-energized. An A.C. or a D.C. current may be used to hold the piston, however D.C. current is preferred to prevent any chattering of the piston acting as an armature to the magnet.

When the safety rod is in its extracted position and a nuclear reaction is taking place in the reactor, a pressurized air supply is maintained within the accumulator tank 46 sufficient to propel the safety rod into the reactor within a fraction of a second. A high pressure is established in the accumulator 46 by means of an air supply 78 connected to the accumulator through a solenoid operated air supply valve 80. The air under high pressure is then maintained in the accumulator tank and is available to charge the safety rod into the reactor at any time regardless of any failure in the primary air supply.

It will be noted that even though there is a high pressure built up in the accumulator the total force on the piston 30 when in its uppermost position is very small. This is because the aperture 50 and the valve means 48 serve to restrict the area on the upper end of the piston on which the pressure will operate. Thus the magnetizable piston along with the safety rod and extension are readily held by the magnetic force when the coil 72 is energized.

In the event of a scram condition, however, the coil 72 is de-energized removing the magnetic force attracting the piston 30. The safety rod and piston begins to drop under the force of gravity and when it moves a slight distance the seals 60 and 64 on the disk 56 unseat themselves. The air pressure is then effective over the entire area of the piston to provide a substantial accelerating force to propel the rod downward.

A check valve 82 is provided near the top of the cylinder 28 to act as a vacuum relief valve. This valve will permit air flow into the cylinder 28 in the event that there is no air pressure in the accumulator 46 when the magnet is de-energized. Under certain conditions the formation of a vacuum above the piston could keep the rod from entering the reactor.

When the piston 30 is in its uppermost position a limit switch 84 is caused to operate the solenoid operated 3-way valve 32 to vent the bottom of the cylinder 28 to atmosphere. Thus the valve serves as an exhaust port to prevent a pressure buildup in the cylinder that could also keep the rod from dropping. During a rod drop this open port exhausts air from the cylinder below this piston and thus permits shorter insertion times. The exhaust port must not be sized so large as to prevent the formation of an air cushion to decelerate the rod. During the last few feet of rod travel, therefore, air pressure will begin to build up in the cylinder because its volume decreases faster than air exhausts through the exhaust port. A relief valve 86 provided at the bottom of the cylinder 28 opens when the pressure in the cylinder below the piston reaches the valve set pressure. If this air were not vented from the cylinder it would re-expand and drive the rod from the reactor. By proper sizing of the relief valve in the exhaust port it is theoretically possible to bring the rod to zero velocity with atmospheric pressure below the piston as it reaches the desired travel. In practice this goal is never attained because of varying accelerating air pressure changes in friction forces and varying discharge rates from the valve 86 and the exhaust port in the 3-way valve 32. Therefore there will be some tendency for the rod to bounce out of the reactor. The height of the bounce can be minimized however and made small enough to maintain 95% of the control effectiveness of the rod in the reactor. That is, the bounce of the rod may be restricted to a height below 20% of the total depth of the reactor core.

Another limit switch 90 is provided at the bottom of the cylinder 28 and is operable by the position of the piston 30 to operate the vent valve 78 in the accumulator. The limit switches also serve as position indicators by operating desired alarm devices in the operator control room.

There has been described in detail hereinbefore a description of apparatus employing the invention of the applicant. It is his intention not to be bound by that detailed description but to be limited only by the scope of the appended claims.

What is claimed is:

1. Apparatus for operating a vertically translatable object comprising a magnetizable piston attached to the upper end of the object, a vertical cylinder in which the piston and object move, means for moving the piston upwardly, an electromagnet forming the top of the cylinder, the upper end of the piston having a recess, a headed retaining member secured to the bottom of the recess and projecting beyond the upper end of the piston, a sealing disk mounted on the retaining member, a spring urging the disk against the head on the retaining member, the electromagnet having a central opening adapted to receive the retaining member when the piston is at the top of the cylinder, the sealing disk adapted to close the opening in the magnet when the head on the retaining member is within said opening, a gas-tight tank communicating with the cylinder by means of said opening, a regulatable air supply connected to said tank, and a valve on said tank to controllably reduce gas pressure built up within the tank.

2. Apparatus for operating a vertically translatable object comprising a magnetizable piston attached to the upper end of the object, a vertical cylinder in which the piston and object move, means for moving the piston upwardly, an electromagnet forming the top of the cylinder, the upper end of the piston having a recess, a rod having its lower end secured to the bottom of the recess and its upper end projecting beyond the upper surface of the piston, a retaining head at the upper end of said rod, a sealing disk mounted on the rod, a helical spring surrounding said rod within said recess and adapted to constrain said sealing disk against said retaining head, the electromagnet having a central opening adapted to receive the rod when the piston is at the upper end of the cylinder, the sealing disk adapted to close the opening in the magnet when the upper end of the rod is within the opening, said recess adapted to receive said sealing disk when the piston is in its uppermost position so that said piston fits flush with the top of said cylinder, a gas-tight tank communicating with the cylinder by means of said opening, a regulatable air supply connected to said tank, and a valve on said tank to controllably reduce gas pressure built up within the tank.

3. Apparatus for operating a vertically translatable object comprising a magnetizable piston attached to the upper end of the object, a cylinder in which the piston and object move, an electromagnet forming the top of the cylinder, the upper end of the piston having a recess, a rod having its lower end secured to the bottom of the recess and its upper end projecting beyond the upper surface of the piston, a retaining head at the upper end of said rod, a sealing disk mounted on the rod, a helical spring surrounding said rod within said recess and adapted to constrain said sealing disk against said retaining head, the electromagnet having a central opeinng adapted to receive the rod when the piston is at the upper end of the cylinder, the sealing disk adapted to close the opening in the magnet when the upper end of the rod is within the opening, said recess adapted to receive said sealing disk when the piston is in its uppermost position so that said piston fits flush with the top of said cylinder, a gas-tight tank communicating with the cylinder by means of said opening, a regulatable air supply connected to said tank, a valve on said tank to controllably reduce gas pressure built up within the tank, a 3-way solenoid valve connected to the bottom of said cylinder, an air supply connectable to the bottom of the cylinder through said 3-way solenoid valve, the bottom of said cylinder also connectable to the atmosphere through said 3-way solenoid valve, and a safety relief valve connected to the bottom of said cylinder.

4. In combination with a nuclear reactor; a vertically translatable safety rod; means for operating said safety rod comprising; a magnetizable piston attached to the upper end of the safety rod, a vertical cylinder in which the piston and object move, means for moving the piston upwardly, an electromagnet forming the top of the cylinder, the upper end of the piston having a recess, a headed retaining member secured to the bottom of the recess and projecting beyond the upper end of the piston, the sealing disk mounted on the retaining member, a spring urging the disk against the head on the retaining member, the electromagnet having a central opening adapted to receive the retaining member when the piston is at the top of the cylinder, the sealing disk adapted to close the opening in the magnet when the head on the retaining member is within said opening, a gas-tight tank communicating with the cylinder by means of said opening, a regulatable air supply connected to said tank, and a valve on said tank to controllably reduce gas pressure built up within the tank.

5. In combination with a nuclear reactor; a vertically translatable safety rod; means for operating said safety rod comprising; a magnetizable piston attached to the upper end of the safety rod, a vertical cylinder in which the piston and object move, means for moving the piston upwardly, an electromagnet forming the top of the cylinder, the upper end of the piston having a recess, a rod having its lower end secured to the bottom of the recess and its upper end projecting beyond the upper surface of the piston, a retaining head at the upper end of said rod, a sealing disk mounted on the rod, a helical spring surrounding said rod within said recess and adapted to constrain said sealing disk against said retaining head, the electromagnet having a central opening adapted to receive the rod when the piston is at the upper end of the cylinder, the sealing disk adapted to close the opening in the magnet when the upper end of the rod is within the opening, said recess adapted to receive said sealing disk when the piston is in its uppermost position so that said piston fits flush with the top of said cylinder, a gas-tight tank communicating with the cylinder by means of said opening, a regulatable air supply connected to said tank, and a valve on said tank to controllably reduce gas pressure built up within the tank.

6. In combination with a nuclear reactor; a vertically translatable safety rod; means for operating said safety rod comprising; a magnetizable piston attached to the upper end of the safety rod, a cylinder in which the piston and object move, an electromagnet forming the top of the cylinder, the upper end of the piston having a recess, a rod having its lower end secured to the bottom of the recess and its upper end projecting beyond the upper surface of the piston, a retaining head at the upper end of said rod, a sealing disk mounted on the rod, a helical spring surrounding said rod within said recess and adapted to constrain said sealing disk against said retaining head, the electromagnet having a central opening adapted to receive the rod when the piston is at the upper end of the cylinder, the sealing disk adapted to close the opening in the magnet when the upper end of the rod is within the opening, said recess adapted to receive said sealing disk when the piston is in its uppermost position so that said piston fits flush with the top of said cylinder, a gas-tight tank communicating with the cylinder by means of said opening, a regulatable air supply connected to said tank, a valve on said tank to controllably reduce gas pressure built up within the tank, a 3-way solenoid valve connected to the bottom of said cylinder, an air supply connectable to the bottom of the cylinder through said 3-way solenoid valve, the bottom of said cylinder also connectable to the atmosphere through said 3-way solenoid valve, and a safety relief valve connected to the bottom of said cylinder.

References Cited in the file of this patent

UNITED STATES PATENTS

| | | |
|---|---|---|
| 671,559 | Lindstrom | Apr. 9, 1901 |
| 1,604,548 | Dapron | Oct. 26, 1926 |
| 1,744,069 | Dapron | Jan. 21, 1930 |
| 2,553,810 | Carlson | May 22, 1951 |
| 2,855,899 | Beaty | Oct. 14, 1958 |
| 2,890,158 | Ohlinger et al. | June 9, 1959 |

OTHER REFERENCES

Nucleonics, vol. 13 (November 1955), pages 116, 118, 120, 122 (article by Rice). (Copy in Scientific Library and 204/154.3).